S. J. BENS.
LINK BELT OR CHAIN.
APPLICATION FILED MAR. 10, 1915. RENEWED JUNE 15, 1917.
1,259,715.
Patented Mar. 19, 1918.
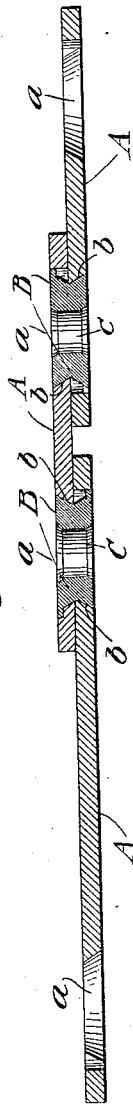
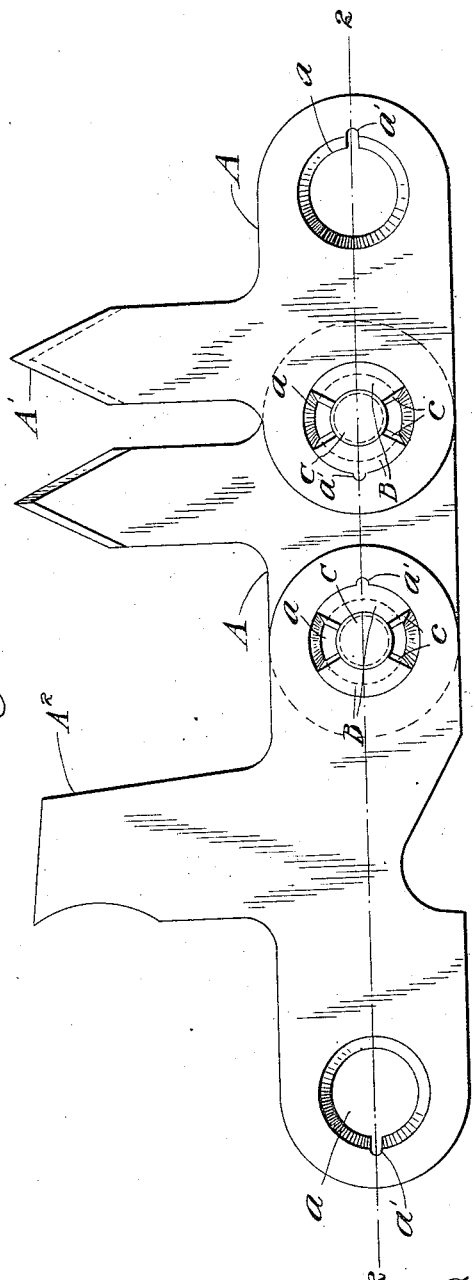
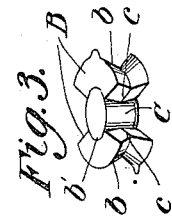
Attest:
E. M. Hamilton
C. E. Parsons
Inventor:
Samuel J. Bens.
by Strum Middleton Donaldson & Shear
Attys.

UNITED STATES PATENT OFFICE.

SAMUEL J. BENS, OF BERKELEY, CALIFORNIA.

LINK BELT OR CHAIN.

1,259,715.                 Specification of Letters Patent.      Patented Mar. 19, 1918.

Application filed March 10, 1915, Serial No. 13,463. Renewed June 15, 1917. Serial No. 175,044.

*To all whom it may concern:*

Be it known that I, SAMUEL J. BENS, citizen of the United States, residing at Berkeley, California, have invented certain new and useful Improvements in Link Belts or Chains, of which the following is a specification.

My present invention relates to improvements in the joints or connections between the links of link belts or chains.

In the present application, I have illustrated the invention as embodied in or applied to the links of an endless chain saw, but it will be understood that I do not limit myself to this specific application, as it is applicable as a means of connecting links of many different types, but it is thought the illustration of it in connection with an endless chain saw is amply sufficient to give a clear understanding of the invention.

The object of the invention is to provide a simple, strong and durable flush joint connection in which the parts upon which the wear comes may be easily replaced.

In the accompanying drawings

Figure 1 represents a side elevation of a portion of an endless chain saw embodying my improved joint.

Fig. 2 is a section on line 2—2 of Fig. 1;

Fig. 3 is a perspective view of one of the bushings.

Referring by reference characters to this drawing, the letters A, A, designate the overlapping links of an endless chain saw provided with the usual or any desired type of teeth and clearers indicated at A' and A². The overlapping portions of these links are provided with alining openings $a$, the edges of the opening of one link being beveled, inclined or flared outwardly from the opening of the other link, which opening in said other link has its wall reversely flared. In other words, the alining openings are outwardly flared in opposite directions.

It will be understood that by the use of the terms "beveled, inclined or flared", I intend to include not only a straight flare, but also one in which the flaring surface is more or less curved. Within the alining openings of the overlapping links, I place a pair of bushings B of arc-shape, each constituting preferably about one-third of a complete ring, though it will be understood that the lengths of the bushing might vary according to the amount of angular movement to be permitted to the links.

These bushings have their outer peripheries provided with grooves or channels $b$ of V-shape in cross section or concaved to correspond to the walls of the alining openings in the overlapping links. Through the opening provided between the curved inner portions $b'$ of the bushings is passed a pin or rivet C which is headed over just sufficiently to hold it in place. By reason of the V-shaped or concaved peripheries of the bushings engaging the convex or reverse V-shaped walls of the alining openings of the links, the said links will be held together by the bushings as long as the rivet, pin or key is in place. The bushings thus serve to connect the overlapping or adjacent links together, but as no upsetting of the metal of these bushings is required, they may be made of extremely hard material similar to the material of which the links are made, so that they are not subjected to wear, and will last indefinitely, and furthermore, afford a very strong connection owing to the comparatively large bearing area.

As the lateral strain on the links is taken by the bushings, very little upsetting of the key, pin or rivet is necessary to hold it in place, while being made of a lower carbon and sufficiently ductile material it can, when worn, be easily driven out and replaced by a fresh pin.

In order to maintain the bushings in proper position, I provide notched portions or small recesses in one of the parts, say, the chain link, as indicated at $a'$, into which a small portion of the metal of the other part (the bushing) may be displaced to hold the bushing against relative rotary movement in relation to one of the links. One or both of the bushings thus may be locked, but it is preferable to lock both of the bushings, one being locked to one of the links and the other bushing locked to the other link. In order to prevent the arc-shaped openings between the bushings from being clogged with material, such, for instance, as sawdust, when the joint is used in connection with an endless chain saw, I make the ends of the bushings of wedge-shape, as indicated at $c$.

Having thus described my invention what I claim is:

1. In a link belt or chain joint, a pair of overlapping links have alining openings, the edges of the openings formed by the assembled links being of convex form, a pair of arc-shaped bushings having channeled outer peripheries engaging said convexed openings, and a pin or rivet between said arc-shaped bushings.

2. In a link belt or chain joint, a pair of overlapping links having alining openings provided with reversely flared walls, a pair of arc-shaped bushings having channeled peripheries engaging said flared walls, and a key pin or rivet between said arc-shaped bushings, one of said bushings being locked to one of the links.

3. In a link belt or chain joint, a pair of overlapping links having alining openings provided with reversely flared walls, a pair of arc-shaped bushings having channeled peripheries engaging said flared walls, and a key pin or rivet between said arc-shaped bushings, one of said bushings being locked to one of the links and the other bushing to the other link, substantially as described.

4. In a link belt or chain joint, a pair of overlapping links having reversely flared openings, a pair of arc-shaped bushings having channeled outer peripheries engaging said openings, and a keying pin or rivet between said arc-shaped bushings, said bushings having wedge-shaped ends, substantially as described.

In testimony whereof, I affix my signature in presence of two witnesses.

SAMUEL J. BENS.

Witnesses:
JAMES M. SPEAR,
BENNETT S. JONES.

Copies of this patent may be obtained for five cents each, by addressing the "Commissioner of Patents Washington, D. C."